July 2, 1957 F. W. ANDERSON 2,797,627
ADJUSTABLE PLOW
Filed Dec. 29, 1954 2 Sheets-Sheet 2
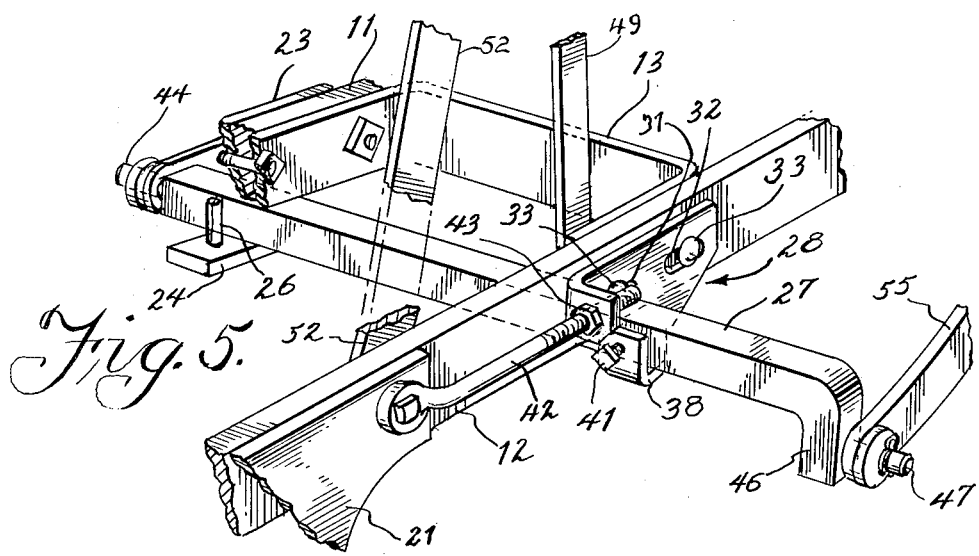
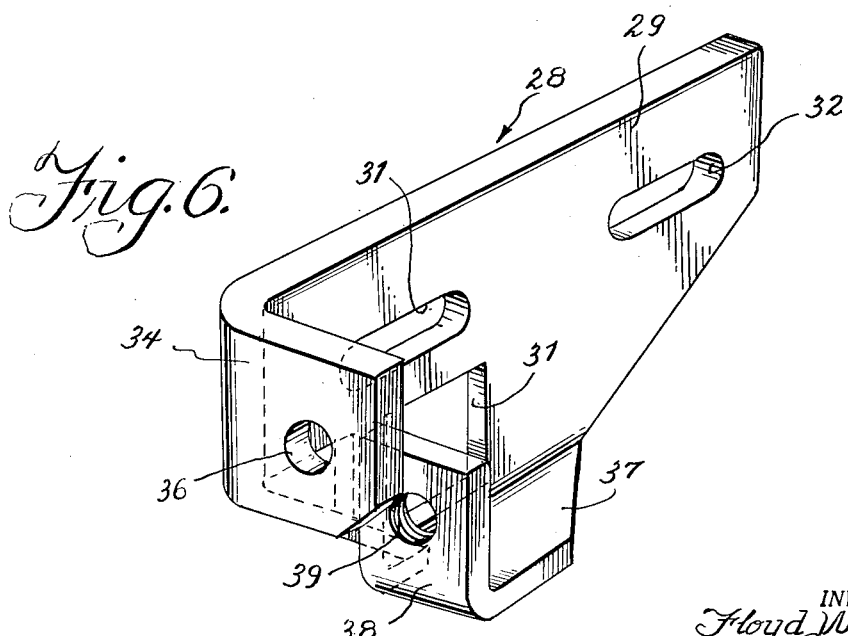
INVENTOR.
Floyd W. Anderson
BY Nathan H. Kraus
Frank H. Marks
ATTORNEYS

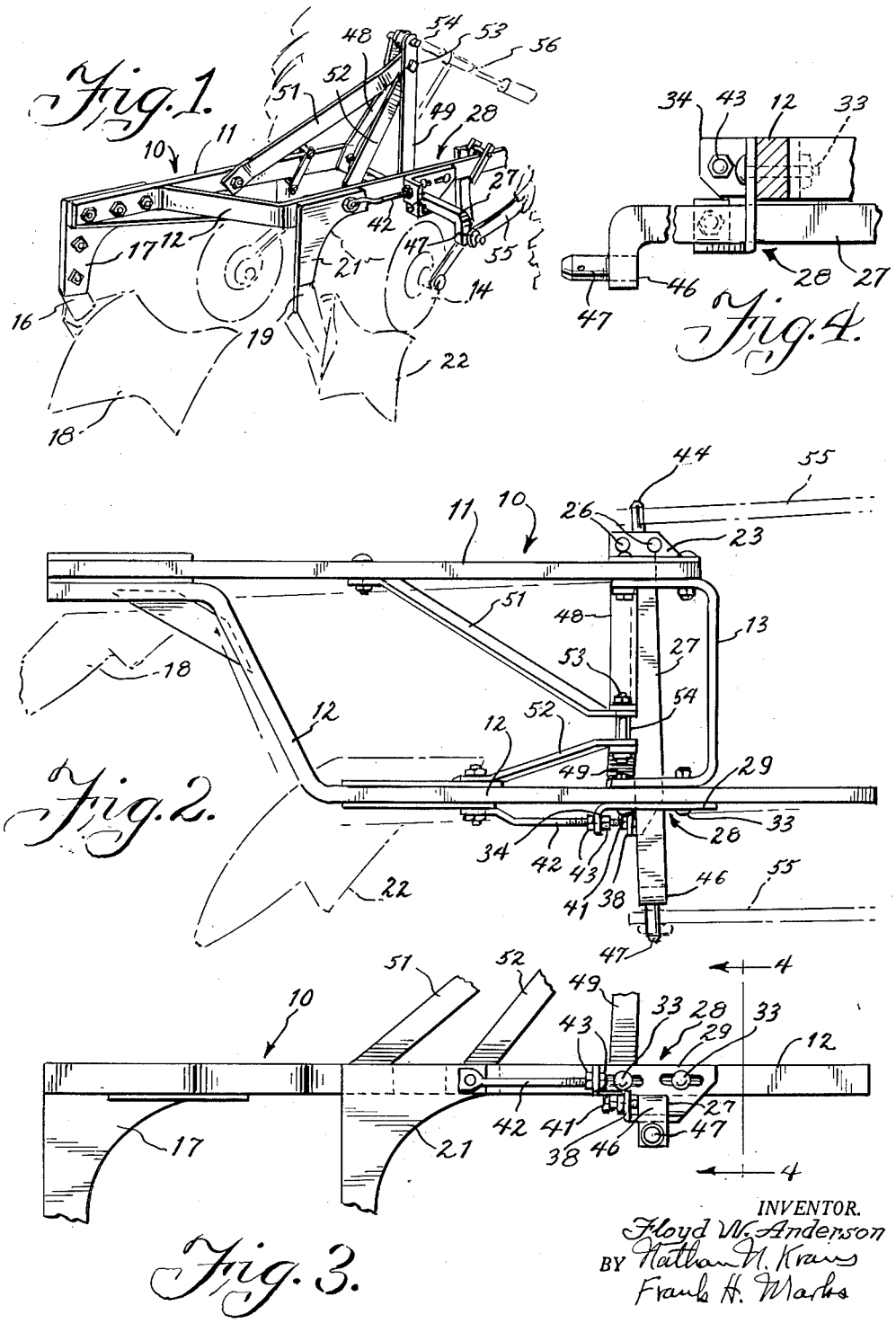

2,797,627

ADJUSTABLE PLOW

Floyd W. Anderson, Kankakee, Ill., assignor to Sears, Roebuck and Co., Chicago, Ill., a corporation of New York Application December 29, 1954, Serial No. 478,239

4 Claims. (Cl. 97—47.53)

My invention relates to improvements in plows.

One of the objects of my invention is the provision of a plow embodying adjustable means by which the attitude of the plow bottom may be adjusted with relation to the line of draft, so that the effective width of the plowed furrow may be varied.

A further object of my invention is the provision of a plow of the foregoing character, which is simple in construction, durable in service and efficient in operation.

Other and further objects and advantages of my invention will become apparent from the following description when considered in connection with the accompanying drawings, in which—

Fig. 1 is a perspective view of a plow construction embodying my invention;

Fig. 2 is a plan view thereof on an enlarged scale;

Fig. 3 is a fragmentary side elevational view thereof;

Fig. 4 is a cross-sectional view taken substantially on line 4—4 of Fig. 3;

Fig. 5 is a fragmentary perspective view on an enlarged scale; and

Fig. 6 is a perspective view, on an enlarged scale, of a detail of construction.

Referring to the drawings, my invention comprises a frame 10 formed of beam members 11 and 12, said beam members being shaped substantially as illustrated and being bolted together at their rear end portions and connected at their forward end portions by a transverse brace 13 bolted to said members. The beam member 12 extends forwardly of the brace 13 and is arranged to mount thereon a tool such as a coulter 14, which depends therefrom. The beam member 11, at the extreme rearward end thereof, is provided with a depending arm 16 reinforced by welded plates 17, the arm being adapted for mounting a plow bottom 18 or other ground-working tool. Intermediate the member 12 is provided a depending arm 19 similarly reinforced by plates 21 and similarly adapted to mount a plow bottom 22 or other ground-working tool. It will be observed that the plow-bottoms 18 and 22 are in spaced relationship, with the plow bottom 22 being disposed forwardly in relation to the plow bottom 18.

Bolted to the forward end of the beam member 11 is an angle bracket 23 which cooperates with a bracket strap 24 and bolts 26 to secure one end of a cross-shaft 27 to the beam member. The other end portion of the cross-shaft 27 is secured to the opposite beam member 12 by means of a bracket indicated generally by the numeral 28. The said bracket is shown clearly in Fig. 6 and includes a main body portion 29 provided with two longitudinally extending slots 31 and 32 to register with apertures in the beam member 12 and to receive bolts 33 which pass therethrough for securing the bracket 28 to the beam member 12. As will be apparent, the slots 31 and 32 afford longitudinal adjustment of the bracket 28 relative to the beam member 12, and the bolts 33 effect securement of the said bracket in a position of adjustment. The rearward end 34 of the bracket 28 is bent at right angles to the plane of the body portion 29 and is provided with an aperture 36. The lower end portion 37 of the bracket is bent at a right angle to the plane of the body portion 29, and the rearward portion 38 of said lower end is again bent at a right angle to assume a position in spaced parallel relation to the end portion 34 and is provided with a threaded aperture 39. The body portion 29 of the bracket is provided with a substantially square cut-out 31 through which is adapted to pass the cross-shaft 27, the said shaft being supported on the horizontal portion 37 of the bracket.

A bolt 41 is received in aperture 39 and is intended to engage the cross-shaft 27 to clamp the same to the bracket, the bolt being provided with a lock nut. A bracket adjustment member in the form of a threaded rod 42 is bolted at one end to the beam member 12, with the threaded end of said rod passing through the aperture 36 in the bracket. A pair of jam nuts 43 abutting on opposite sides of the end portion 34 of the bracket and in threaded engagement with the rod 42, affords means for effecting adjustment of the cross-shaft 27 relative to the frame 10, as will be hereinafter more fully described.

The cross-shaft 27 is substantially square in cross-section and is provided at one end with an integral axial pin 44. The opposite end 46 of the cross-shaft is bent downwardly at a right angle to the main body portion and is similarly provided with a pin 47 which extends in an opposite direction from the pin 44, but is axially offset therefrom. A pair of front upwardly extending struts 48 and 49 are bolted to beam members 11 and 12, respectively, each of said struts having two vertically spaced registering apertures in the upper portions thereof. A pair of rear upwardly extending struts 51 and 52 are similarly bolted to frame members 11 and 12, respectively, and each of said struts is provided with an aperture at the upper end. These apertures register with the lower apertures in the front struts to receive a bolt 53 which secures the struts together. A pin 54 is received in the upper apertures of the front struts.

The plow is adapted to be connected to a conventional tractor by conventional lower drawbar links 55 which engage the pins 44 and 47 of the cross-shaft and by an upper link 56 connected to a suitable part of the tractor. It will be observed that the struts 48 and 51 are offset to a greater degree than the opposed struts 49 and 52, so as to locate the pin 54 engaged by the link 56 in a zone substantially medially of the cross-shaft 27. It will be apparent that the hitching means for the plow affords a three-point hitch connection whereby the frame and plow bottoms may be rocked about the axes of the pins 44 and 47 by adjusting the position of the upper link 56 to afford control of the working depth of the plow bottoms.

As hereinbefore noted, my invention provides means for adjusting the attitude of the plow bottoms 18 and 22 in relation to a longitudinal line of draft, whereby the effective width of the furrow plowed may be varied to a limited degree. Such adjustment may be effected by first loosening the bolts 26 and then loosening the bolts 33, so that the cross-shaft 27 and bracket 28 may slide relative to the beam members 11 and 12 within the limits of the slots 32. By rotating the jam nuts 43 to advance in a rearward direction, or to the left as viewed in Fig. 2, it will be seen that the entire frame will be caused to shift to the dotted-line position illustrated in Fig. 2, so as to change the relationship of the beam members 11 and 12 with respect to the cross-shaft 27. This dotted-line position illustrates a maximum width of cut capable of being effected by the plow bottoms. When a desired adjustment has been effected, the bolts 26 and 33 in the brackets 23 and 28 may be tightened to effect securement.

It will of course be understood that the plow bottoms may be adjusted to any intermediate position within the limits of the slots.

Various improvements and modifications coming within the spirit of my invention will doubtless suggest themselves to those skilled in the art. Hence, I do not wish to be limited to the specific form shown or uses mentioned.

I claim:

1. In a plow adapted for attachment to a tractor having a pair of transversely spaced drawbar links, a rigid frame including a pair of transversely spaced beam members, a cross shaft having end portions adapted for respective engagement with said tractor drawbar links, means for securing said cross shaft to said beam members in adjustable transverse relationship, comprising a clamping member for securing one end portion of said cross shaft to the under surface of one of said beam members, a bracket having a main body portion adapted to lie contiguous to a vertical side wall of the other of said beam members and to be longitudinally adjustably secured thereto, the rearward end portion of said bracket extending laterally in a vertical plane at a right angle to said main body portion and having an aperture therein, the lower portion of said bracket extending laterally in a horizontal plane at a right angle to said main body portion and affording a support for the opposite end portion of said cross shaft, means for securing said cross shaft to said bracket, screw means carried on said last-mentioned beam member and passing through said aperture, and means cooperating with said screw means for adjusting the angular relationship of said cross shaft relative to said beam members.

2. In a plow adapted for attachment to a tractor having a pair of transversely spaced drawbar links, a rigid frame including a pair of transversely spaced beam members, a cross shaft having end portions adapted for respective engagement with said tractor drawbar links, means for securing said cross shaft to said beam members in adjustable transverse relationship, comprising a clamping member for securing one end portion of said cross shaft to the under surface of one of said beam members, a bracket having a main body portion adapted to lie contiguous to a vertical side wall of the other of said beam members, bolt means for securing said body portion of the bracket to said vertical side wall, said body portion having longitudinally extending slots cooperating with said bolt means to permit selective longitudinal positioning of said bracket relative to said last-mentioned beam member, the rearward end portion of said bracket extending laterally in a vertical plane at a right angle to said main body portion and having an aperture therein, the lower portion of said bracket extending laterally in a horizontal plane at a right angle to said main body portion and affording a support for the opposite end portion of said cross shaft, means for securing said cross shaft to said bracket, screw means carried on said last-mentioned beam member and passing through said aperture, and means cooperating with said screw means for adjusting the angular relationship of said cross shaft relative to said beam members.

3. In a plow adapted for attachment to a tractor having a pair of transversely spaced drawbar links, a rigid frame including a pair of transversely spaced beam members, a cross shaft having end portions adapted for respective engagement with said tractor drawbar links, means for securing said cross shaft to said beam members in adjustable transverse relationship, comprising a clamping member for securing one end portion of said cross shaft to the under surface of one of said beam members, a bracket having a main body portion adapted to lie contiguous to a vertical side wall of the other of said beam members and to be longitudinally adjustably secured thereto, the rearward end portion of said bracket extending laterally in a vertical plane at a right angle to said main body portion, the lower portion of said bracket extending laterally in a horizontal plane at a right angle to said main body portion and affording a support for the opposite end portion of said cross shaft, means for securing said cross shaft to said bracket, screw means carried on said last-mentioned beam member, and means cooperating with said screw means for adjusting the angular relationship of said cross shaft relative to said beam members.

4. In a plow adapted for attachment to a tractor having a pair of transversely spaced drawbar links, a rigid frame including a pair of transversely spaced beam members, a cross shaft having end portions adapted for respective engagement with said tractor drawbar links, means for securing said cross shaft to said beam members in adjustable transverse relationship, comprising a clamping member for securing one end portion of said cross shaft to the under surface of one of said beam members, a bracket having a main body portion adapted to lie contiguous to a vertical side wall of the other of said beam members and to be longitudinally adjustably secured thereto, the rearward end portion of said bracket extending laterally in a vertical plane at a right angle to said main body portion and having an aperture therein, the lower portion of said bracket extending laterally in a horizontal plane at a right angle to said main body portion and affording a support for the opposite end portion of said cross shaft, said body portion having an opening adjacent said lower portion of the bracket to receive said opposite end portion of said cross shaft, the rearward part of said lower portion being bent upwardly at a right angle in a plane parallel to the rearward end portion of the bracket and having a threaded aperture therein, a screw received in said aperture and being adapted to clamp said cross arm to said bracket, screw means carried on said last-mentioned beam member and passing through said aperture, and means cooperating with said screw means for adjusting the angular relationship of said cross shaft relative to said beam members.

References Cited in the file of this patent

UNITED STATES PATENTS

| | | |
|---|---|---|
| 2,445,145 | Love | July 13, 1948 |
| 2,609,742 | Love | Sept. 9, 1952 |
| 2,704,019 | Altgelt | Mar. 15, 1955 |
| 2,704,020 | Wilson | Mar. 15, 1955 |